Sept. 5, 1950 J. E. WALSH ET AL 2,521,139
MULTIPLE-HOOK FISH BAIT
Filed Sept. 15, 1945
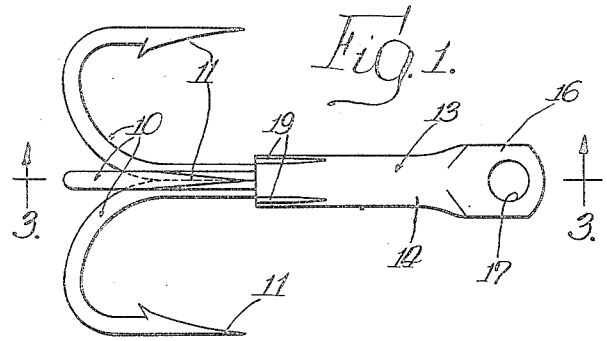
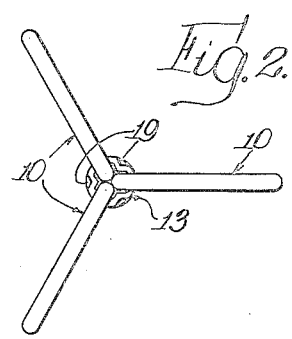
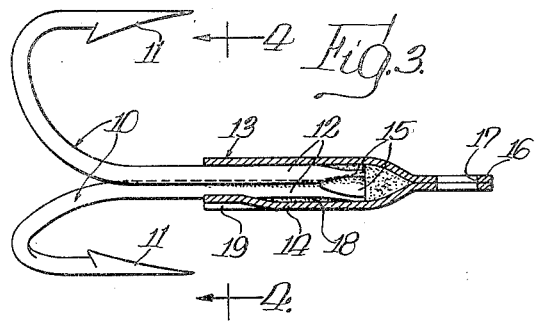
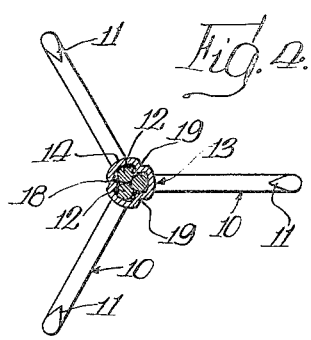
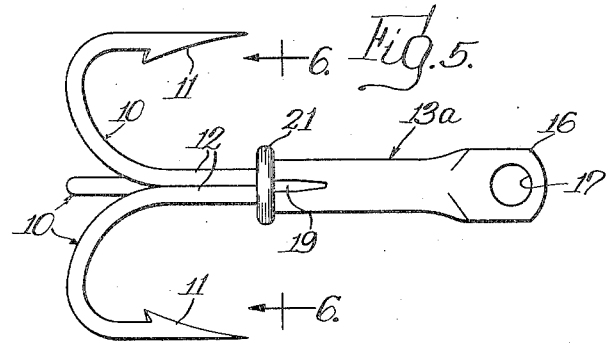
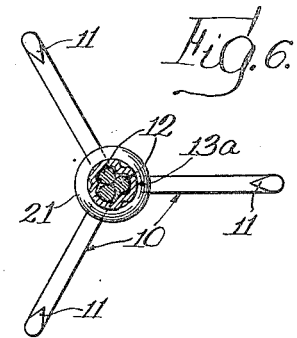
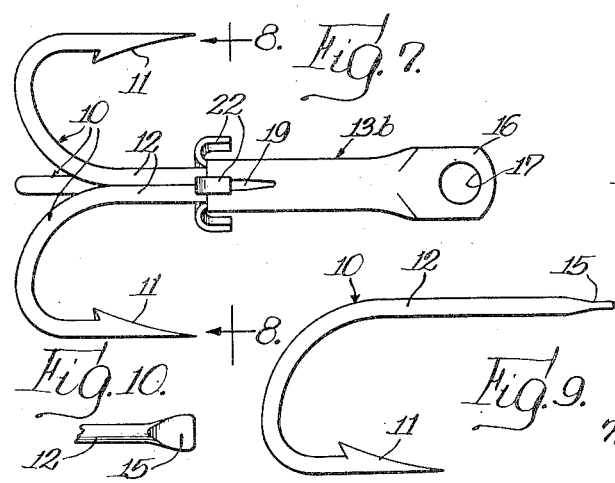
INVENTORS.
John E. Walsh,
BY Sebastiano Lando,
Mueller, Dodds & Mason
Atty's.

Patented Sept. 5, 1950

2,521,139

UNITED STATES PATENT OFFICE 2,521,139

MULTIPLE-HOOK FISH BAIT

John E. Walsh, Franklin Park, and Sebastiano Lando, Chicago, Ill., assignors to Land-O-Tackle, Inc., Chicago, Ill., a corporation of Illinois Application September 15, 1945, Serial No. 616,632

3 Claims. (Cl. 43—44.8)

Our invention relates to fishing tackle, and more in particular to a multiple-hook unit which is adapted for use with many types and varieties of bait. Prior to the present invention, multiple-hook devices have been used. However, when a double hook was used, normally the shanks were wrapped with wire, gut, or the like, to hold them together, and then when a unit of more than two hooks was used, the conventional practice was to provide a two-hook unit and a single hook unit, for instance, making a three hook unit. The assembly was clumsy and costly, and the fastening was insecure so that during the life of the device the shanks would separate from one another. In other multiple-hook prior devices, a three hook device which comprised a double hook unit having a single integral shank bent upon itself, and then an additional single shank hook, all wrapped or otherwise secured together, was used. This was expensive and required an inventory of different hooks, which was not satisfactory from a cost and operating standpoint.

An object of our invention is to provide a rugged, simple and inexpensive multiple-hook fishing tackle device.

Another object is the provision of a fish hook structure or device which is readily adapted to an assembly of two or more single standard hook elements to provide a unit with any deired number of hooks, depending upon the number of single elements assembled together.

A still further object of our invention is to provide a fishing tackle unit which uses substantially standard elements, and which by merely changing the number of elements and a change in configuration of only one thereof, will provide a two, three or four, or more pronged-hook unit.

A feature of our invention is the provision of a rugged integral multiple-hook unit which is made up from a plurality of identical single standard hooks which are tempered and plated before assembly, and then are rigidly secured in a sleeve or housing for the individual shanks. The sleeve or housing is provided in identical configurations, but different size, depending on the number of hook shanks to be assembled into the unit.

Other objects and features of our invention will be apparent from the following description taken with the drawings in which:

Fig. 1 is a side elevation of an assembled three-hook device;

Fig. 2 is a top plan view thereof;

Fig. 3 is a side view partly in section and taken along the line 3—3 of Fig. 1;

Fig. 4 is a cross sectional view along the line 4—4 of Fig. 3;

Fig. 5 is an assembled view, similar to Fig. 1, of a modification of the structure of Fig. 1;

Fig. 6 is a sectional view along the line 6—6 of Fig. 5 looking in the direction of the arrows indicated thereon.

Fig. 7 is a side view of a further modification of our multiple-hook invention;

Fig. 8 is a cross sectional view along the line 8—8 of Fig. 7;

Fig. 9 is a side view of a single hook as used in the structures of Figs. 1 to 8, inclusive and showing particularly the flattened end on the shank; and Fig. 10 is a fragmentary top view of the flattened end of the shank of Fig. 9.

Referring now to Figs. 1 to 4, inclusive, and Figs. 9 and 10, a treble-hook embodiment of our invention is illustrated, comprising three identical hooks 10, each having a hook portion 11 and a shank 12. The shank end of each hook 10 is flattened as shown at 15 to prevent turning in, and withdrawal from a sleeve, as will be described. Each hook 10 is hardened and then cadmium-plated in the complete forming and processing operation therefor. A preformed metal sleeve 13 is provided having a cylindrical portion 14, and a flat apertured portion 16 flattened out to close one end of the sleeve and at the same time provide a mounting to secure the device to a line, leader, or the like. The aperture is identified by the reference character 17.

In the assembly of the device a small pellet of solder is dropped into the preformed sleeve, or housing 13. The latter is secured in a jig, the shanks 12 of the three hooks 10 are introduced into the cylindrical portion 14, and then by means of a spring portion for the assembly jig or fixture, pressure is applied equally and simultaneously to all three hooks. Meanwhile the solder in the pellet is melted by high frequency heating so that the hooks under pressure are pressed into the melted solder to the position of Fig. 3. During this operation the solder flows around the shanks of the hooks and bonds them together and to the inside of the cylindrical portion 14 providing a substantially integral assembly for the various elements. The solder is shown generally in a pebbled representation in Fig. 3 indicated by the reference character 18, and as previously mentioned, it is understood that the solder flows around the hook shanks 12, and throughout the lower housing 13 so as to firmly secure the elements together into an integral unit.

After the solder is hardened the jig is operated to crimp the sleeve or housing 13 at the portion 19 around the open end of the cylindrical portion 14 and intermediate each two adjacent shanks as shown in Fig. 4. This reinforces the bonding effected by the soldered connection of the elements, and this coupled with the flat end 15 of each shank 12 provides positive security against any relative rotational movement among the elements 11—12, or of the elements 11—12, relative to the sleeve 13 or the withdrawal of a hook from the sleeve. The dimension of the flat end 15 on each shank relative to the crimped mouth or open end of the sleeve 13 is such as to prevent the withdrawal of a hook.

A modification is shown in Figs. 5 and 6 comprising the identical hook structure of Figs. 1 to 4, but employing a sleeve or a housing 13a having a preformed flange 21 around the upper, or originally open end of the cylindrical portion of the housing. A similar modification is illustrated in Figs. 7 and 8, and this housing 13b includes a plurality of fingers 22 which are provided in the initial forming of the housing. Thereafter in the complete assembly of the device they are bent to the configuration shown in Fig. 7 to provide an annular broken recess underneath the fingers and around such portion of the outside of the housing.

With the housing modifications of Figs. 5 to 8, inclusive, it is possible to secure flies, weed guards, weights, bait material, and the like, to the outside of the device and adjacent the hooks in the most desirable position for an attractive piece of tackle. As a matter of fact, the housing is adapted to numerous configurations both as illustrated, and in a manner which is not illustrated, to not only serve as a housing, but as a fishing lure of any desired configuration. In each of the modifications of Figs. 5 to 8, inclusive, the single identical hooks of Figs. 9 and 10 are assembled into the housing in the manner described relative to the structure of Figs. 1 to 4, inclusive.

From the preceding description, it is apparent, therefore, that we provide a hook unit for fishing tackle which may have a double, triple, or even quadruple hook formation. This is all accomplished with a single, standard hook assembled into a sleeve which would vary at most only in the diameter that might be required to accommodate varying numbers of identical shanks within the housing. This construction provides, when assembled as previously described, a substantial integral, rugged, and simple unit which can be used without any embellishments, or it is successfully used to carry bait elements, or to serve as a lure.

We claim:

1. A multiple-pronged fish hook unit comprising a plurality of single hooks each having a shank therefor, a sleeve encasing the hook-shanks and having an attaching portion at one end, and means rigidly securing said shanks in said housing to form an integral assembly therewith, said sleeve having an annular flange at the end thereof opposite said attaching portion to hold bait means thereon.

2. A multiple-pronged fish hook unit comprising a plurality of single hooks each having a shank therefor, a sleeve encasing the hook-shanks and having an attaching portion at one end, means rigidly securing said shanks in said housing to form an integral assembly therewith, and said sleeve having outwardly projecting means at the end thereof opposite said attaching portion to hold bait thereon.

3. A multiple-pronged fish hook unit comprising a plurality of single hooks each having a shank therefor, a sleeve encasing the hook-shanks and having an attaching portion at one end, means rigidly securing said shanks in said housing to form an integral assembly therewith, and said sleeve having a plurality of circumferentially spaced bait holding fingers extending outwardly therefrom at the end thereof opposite said attaching portion to hold bait thereon.

JOHN E. WALSH.
SEBASTIANO LANDO.

REFERENCES CITED

The following references are of record in the file of this patent:

UNITED STATES PATENTS

| Number | Name | Date |
|---|---|---|
| 260,237 | Reddick | June 27, 1882 |
| 1,490,251 | Adams | Apr. 15, 1924 |
| 1,621,082 | Pflueger | Mar. 15, 1927 |
| 1,625,266 | Mast | Apr. 19, 1927 |
| 2,040,992 | Harris | May 19, 1936 |
| 2,180,557 | Skoverski | Nov. 21, 1939 |
| 2,397,786 | Gascoigne et al. | Apr. 2, 1946 |

FOREIGN PATENTS

| Number | Country | Date |
|---|---|---|
| 26,244 | Norway | Sept. 20, 1915 |